US 9,615,679 B2

(12) United States Patent
Margetts et al.

(10) Patent No.: US 9,615,679 B2
(45) Date of Patent: *Apr. 11, 2017

(54) DISPLAY SYSTEM

(71) Applicant: Dynapac Rotating Company, Inc., Salt Lake City, UT (US)

(72) Inventors: John Richard Margetts, Bountiful, UT (US); Anthony Michael Nuzzolo, East Brunswick, NJ (US); Brian Wilson, Salt Lake City, UT (US); Dan Buckmiller, Salt Lake City, UT (US)

(73) Assignee: DYNAPAC ROTATING COMPANY, INC., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/846,043

(22) Filed: Sep. 4, 2015

(65) Prior Publication Data
US 2015/0374144 A1 Dec. 31, 2015

Related U.S. Application Data

(63) Continuation of application No. 13/898,203, filed on May 20, 2013, now Pat. No. 9,133,980.
(Continued)

(51) Int. Cl.
*A47H 1/10* (2006.01)
*A47F 5/08* (2006.01)
(Continued)

(52) U.S. Cl.
CPC ............ *A47F 5/0892* (2013.01); *A47F 5/10* (2013.01); *B66D 1/60* (2013.01); *F16M 11/046* (2013.01);
(Continued)

(58) Field of Classification Search
CPC .... F16M 13/022; F16M 11/046; F16M 11/08; F16M 13/02; G09F 7/18;
(Continued)

(56) References Cited

U.S. PATENT DOCUMENTS 3,887,090 A 6/1975 Reckseit et al.
7,234,685 B2 6/2007 Britten
(Continued)

FOREIGN PATENT DOCUMENTS

EP 1 672 608 A2 6/2006

OTHER PUBLICATIONS

Daktronics Ad, Daktronics Motorized Banner Hoist, 2 pages, Mar. 3, 2011.
(Continued)

*Primary Examiner* — Gwendolyn Baxter
(74) *Attorney, Agent, or Firm* — Maschoff Brennan

(57) ABSTRACT

In an example embodiment, a system of lifting, lowering and rotating a display may include a housing, a rotator, and a hoist. The rotator may be configured to selectively rotate the housing such that a display functionally coupled to the housing is rotated. The rotator may include an anchor and a rotating portion. The anchor may be configured to be attached to an elevated surface. The rotating portion may be configured to be functionally coupled to the housing, and configured to rotate relative to the anchor. The hoist may include a member and a hoist motor. The hoist motor may be configured to selectively rotate the member such that a cable functionally coupled to the member is wound about the member when the member is rotated in a first direction, and the cable is unwound from the member when the member is rotated in a second direction.

20 Claims, 8 Drawing Sheets

Related U.S. Application Data

(60) Provisional application No. 61/649,105, filed on May 18, 2012.

(51) Int. Cl.

| | | |
|---|---|---|
| *F16M 13/02* | (2006.01) | |
| *F16M 11/04* | (2006.01) | |
| *F16M 11/08* | (2006.01) | |
| *A47F 5/10* | (2006.01) | |
| *B66D 1/60* | (2006.01) | |

(52) U.S. Cl.
CPC ............ *F16M 11/08* (2013.01); *F16M 13/02* (2013.01); *F16M 13/022* (2013.01)

(58) Field of Classification Search
CPC . G09F 15/00; A61M 25/09; A61M 2025/024; A47F 5/0892; A47F 5/10; B66D 1/60
USPC ..................... 248/229.16, 328, 329; 254/385
See application file for complete search history.

(56) References Cited

U.S. PATENT DOCUMENTS

| | | | |
|---|---|---|---|
| 7,753,344 | B1 | 7/2010 | Moretz et al. |
| 9,133,980 | B2 * | 9/2015 | Margetts .............. F16M 13/022 |
| 2005/0230670 | A1 | 10/2005 | Kataoka |
| 2006/0208246 | A1 * | 9/2006 | Britten ..................... G09F 7/18 |
| | | | 254/385 |
| 2007/0220790 | A1 * | 9/2007 | Wagter ................... G09F 17/00 |
| | | | 40/218 |
| 2013/0126809 | A1 | 5/2013 | Britten et al. |

OTHER PUBLICATIONS

FlexiLift Ad, Series 697W, Peter Albrecht Company, 1 page, www.peteralbrecht.com, Jun. 2, 2011.

* cited by examiner

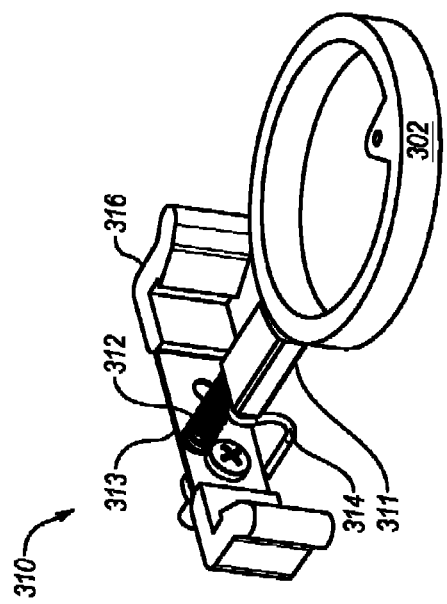
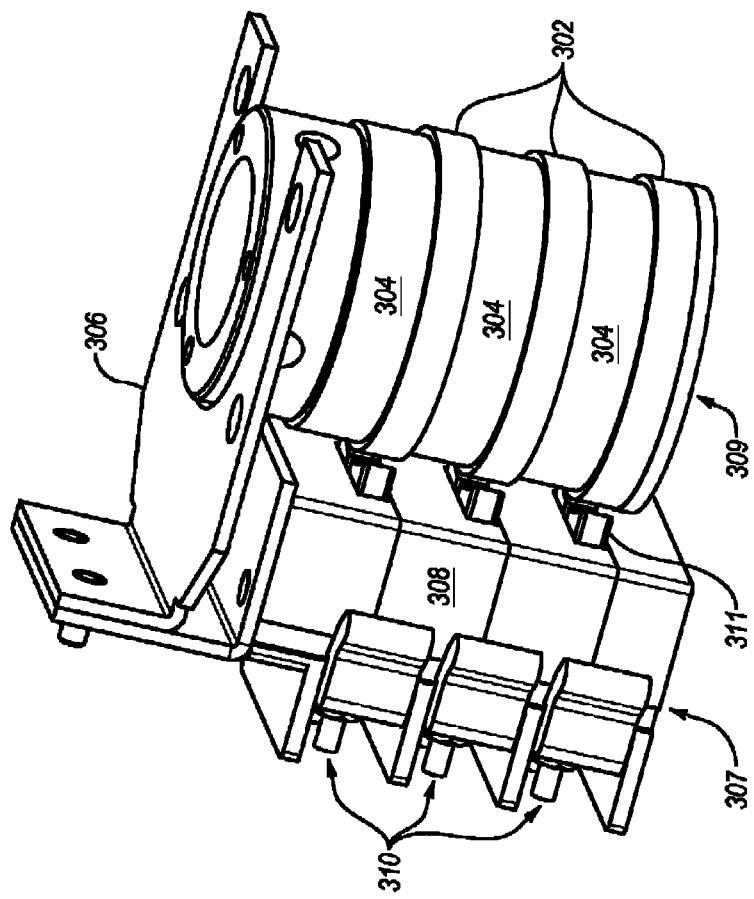
Fig. 3B
Fig. 3A

DISPLAY SYSTEM

CROSS-REFERENCE TO RELATED APPLICATIONS

This application is a continuation of U.S. patent application Ser. No. 13/898,203, filed May 20, 2013, titled DISPLAY SYSTEM, which claims priority to U.S. Provisional Application No. 61/649,105, filed May 18, 2012, titled DEVICE FOR LIFTING, LOWERING AND ROTATING A DISPLAY, both of which are incorporated herein by reference in their entirety.

FIELD

The embodiments discussed herein are related to systems of presenting a display.

BACKGROUND

It may be desirable to exhibit displays at an elevated position. To do so, displays may be attached to an elevated surface such as a ceiling in a way that allows the display to be located at the desired elevation. However, the process of changing an elevated display may include challenges not normally experienced with a display located at or near ground level. Changing some displays may require that a person be elevated to the level of the display. For example, using a ladder or a lift. Elevating a person to the display may prompt safety concerns and slow the process of changing displays. Some displays may be changed using an elongated device, often allowing the person changing the display to remain on the ground. However, safety concerns and speed issues may still remain when displays are changed using an elongated device. Some display products may allow an elevated display to be raised and lowered such that the display may be changed from ground level and raised to the desired elevation after the display has been changed.

The subject matter claimed herein is not limited to embodiments that solve any disadvantages or that operate only in environments such as those described above. Rather, this background is only provided to illustrate one example technology area where some embodiments described herein may be practiced.

SUMMARY

Embodiments relate to systems of presenting a display.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a system of lifting, lowering and rotating a display may include a housing, a rotator, and a hoist. The rotator may be configured to selectively rotate the housing such that a display functionally coupled to the housing is rotated. The rotator may include an anchor and a rotating portion. The anchor may be configured to be attached to an elevated surface. The rotating portion may be configured to be functionally coupled to the housing, and configured to rotate relative to the anchor. The hoist may include a member and a hoist motor. The hoist motor may be configured to selectively rotate the member such that a cable functionally coupled to the member is wound about the member when the member is rotated in a first direction, and the cable is unwound from the member when the member is rotated in a second direction.

Additional features and advantages will be set forth in the description which follows, and in part will be obvious from the description, or may be learned by the practice of the embodiments. The features and advantages of the embodiments will be realized and obtained by means of the instruments and combinations particularly pointed out in the claims. These and other features will become more fully apparent from the following description and claims, or may be learned by the practice of the embodiments as set forth hereinafter.

BRIEF DESCRIPTION OF THE DRAWINGS

To further clarify the above and other advantages and features of the present invention, a more particular description of the invention will be rendered by reference to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 3A illustrates an example interface between an electrical distributor and an electrical receiver of the anchoring device of FIG. 2A;

FIG. 3B illustrates a conductive connector and a conductive member of the example interface of FIG. 3A;

DESCRIPTION OF EMBODIMENTS

Conventional display products that allow an elevated display to be raised and lowered such that the display may be changed from ground level generally do not move the display except when the display is to be changed. However, once the display is raised to a desired elevation, the visibility of the display may not be ideal. For example, when a banner is viewed edge-wise, it may be difficult, if not impossible, to discern an image on the banner. Even if the image on the banner may be discerned, a banner display may be an inefficient form of display from many lines of sight. To avoid such blind spots, multiple copies of the same or similar banner may be displayed within close proximity and at varying orientations. However, such a setup may require multiple display products to display the banners.

Furthermore, conventional display products that allow an elevated display to be raised and lowered such that the display may be changed from ground level generally do not provide electrical power to the display. Electrical power may be utilized to make the display more noticeable or otherwise improve the display by powering an illumination source, electronics incorporated in the display, and the like.

Reference will now be made to the figures wherein like structures will be provided with like reference designations. The drawings are diagrammatic and schematic representations of exemplary embodiments and, accordingly, are not limiting of the scope of the claimed subject matter, nor are the drawings necessarily drawn to scale.

Figure 1A:
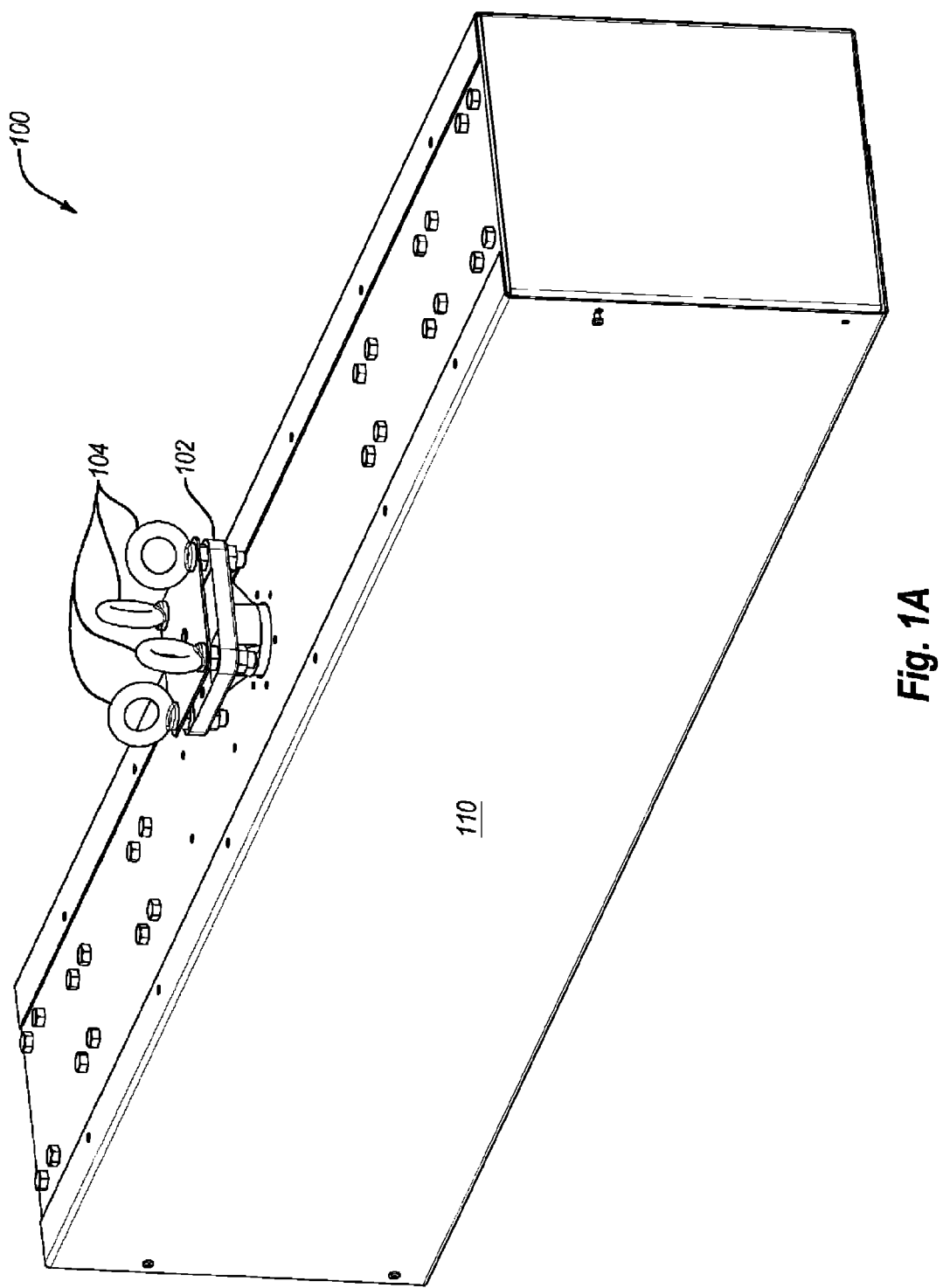
FIG. 1A illustrates a perspective view of an example display system.

FIG. 1A illustrates a perspective view of an example display system 100. The system 100 includes an anchor 102 that may be attached to an elevated surface such as a ceiling. In some embodiments, the system 100 may be affixed directly to the elevated surface. For example, the system 100 may be affixed to a joist, or the like, by way of suitable fasteners 104 such as bolts. The fasteners 104 may be removably connected to the anchor 102.

In some embodiments, the anchor 102 may be attached to an elevated surface by way of attaching members attached to fasteners 104 such as eye bolts as illustrated in FIG. 1A. For example, one end of attaching members may be attached to the fasteners 104 and the other end of the attaching members may be affixed to the elevated. By way of example and not limitation, the attaching members may include cables, chains, rope, or the like. A desired elevation of the system 100 may be achieved by selecting appropriate lengths of the attaching members.

The system 100 may be configured to selectively rotate relative to the anchor 102 such that a display held by the system 100 is rotated. The system 100 may include a housing 110 configured to at least partially enclose components of the system 100. At least a portion of the anchor 102 may extend outside of the housing 110. In some embodiments, the anchor 102 may be located entirely outside the housing 110.

Figure 1B:
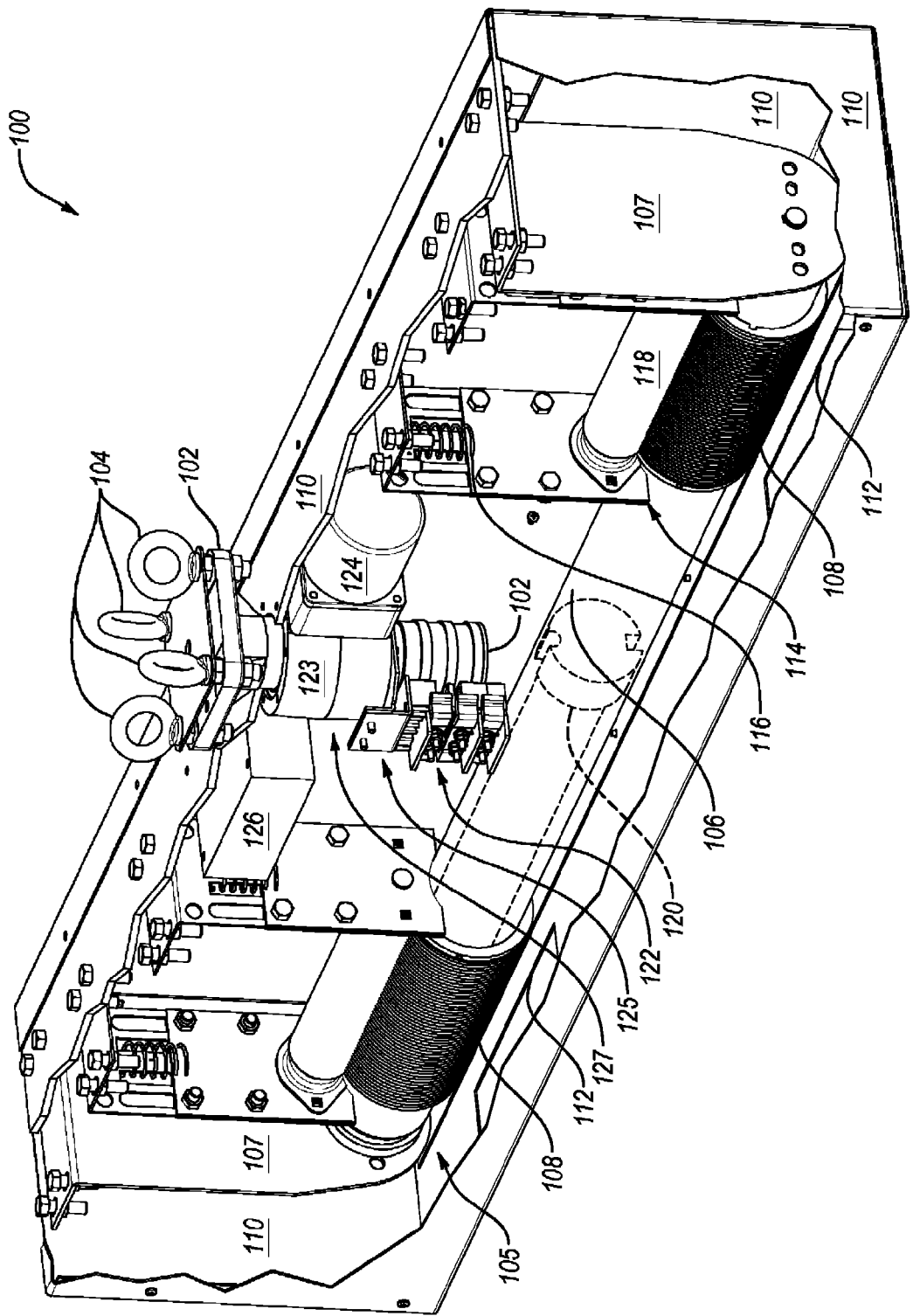
FIG. 1B illustrates a partially cutaway perspective view of the display system of FIG. 1A.

FIG. 1B illustrates a partially cutaway perspective view of the system 100. A rotator 125 may selectively rotate portions of the system 100 relative to the anchor 102. In some embodiments, the rotator 125 includes the anchor 102, an electrical distributor 122, a rotator collar 123, and a rotator motor 124. A rotating portion 127 of the rotator 125 may rotate relative to the anchor 102. The rotating portion 127 may include the electrical distributor 122, the rotator collar 123 and/or the rotator motor 124.

Portions of the system 100 attached to the rotating portion 127 may rotate relative to the anchor 102 when the rotating portion 127 rotates relative to the anchor 102. Likewise, a display (not shown) held by the system 100 may rotate relative to the anchor 102.

The rotator collar 123 may be configured to attach to the anchor 102 such that the rotator collar 123 may relative to the anchor 102. The housing 110 may be attached to the rotator collar 123. An example rotator collar 123 is described below with reference to FIG. 2B and FIG. 2C.

A rotator motor 124 may be attached to the rotator collar 123. The rotator collar 123 may hold the rotator motor 124 in place relative to the anchor 102 such that the rotator motor 124 may drive the rotating portion 127 and components attached to the rotating portion 127 to rotate relative to the anchor 102. An example rotator motor 124 is described below in the discussion of FIG. 2B.

The rotator motor 124 may be wired to a controller 126 and/or to the electrical distributor 122. The electrical distributor 122 may be configured to conductively couple to the anchor 102 such that electrical power is available at the rotating portion 127 as the rotating portion 127 rotates relative to the anchor 102. An example of an electrical distributor 122 is described below with reference to FIG. 3. Wiring of the system 100 is not shown. The controller 126 may be wired to the electrical distributor 122 and may include circuitry for controlling and/or distributing electrical power to electrical components of the system 100.

The rotator motor 124 may be operated wirelessly by remote control. In some embodiments, the controller 126 may allow the rotator motor 124 to be operated by remote control. The controller 126 may include a radio receiver configured to receive operation instructions from a radio transmitter. Alternately or additionally, the rotator motor 124 may include a radio receiver configured to receive operation instructions.

The system 100 may include a hoist 105. The hoist 105 may include a rotatable member 106. The member 106 may be attached to the housing 110 by way of member supports 107. Alternately or additionally, the member 106 may be attached to the rotating portion 127. In some embodiments, the member 106 may have a cylindrical shape, such as is shown in FIG. 1B. Alternately, the member 106 or portions of the member 106 may have a non-cylindrical shape. The member 106 may be configured to be rotated such that one or more cables (not shown) affixed to the member 106 are wound about the member 106 when the member 106 is rotated in a first direction. The cables may unwind from the member 106 when the member 106 is rotated in a second direction. Although one member 106 is shown, multiple members 106 may be included in the system 100.

The cables may exit the housing 110 through openings 112 in the housing 110. A display (not shown) may be attached to the cables. By way of example and not limitation, the cables may be attached to a banner holder configured to hold a printed banner for display. As the member 106 rotates such that the cables are wound about the member 106, the display attached to the cables may be lifted toward the housing 110. As the member 106 rotates such that the cables are unwound from the member 106, the display may be lowered away from the housing 110.

The hoist 105 may include a hoist motor 120. The hoist motor 120 may drive the member 106 to rotate. In some embodiments, the hoist motor 120 may be a tubular motor, such as is shown in FIG. 1B. The member 106 may be hollow and the tubular hoist motor 120 may be placed inside the member 106 and attached to the member support 107 and the member 106 such that the member 106 rotates when the tubular hoist motor 120 is run. Alternately or additionally, another type of hoist motor 120 may be used, including a hoist motor 120 mounted external to the member 106 such that the member 106.

The hoist motor 120 may be prompted to run wirelessly via remote control. In some embodiments, the controller 126 may control the hoist motor 120. Alternately or additionally, the hoist motor 120 may include the controller 126. The hoist motor 120 may be wired to the controller 126 and/or the electrical distributor 122.

The system 100 may raise a display by running the hoist motor 120 in one direction and may lower the display by running the hoist motor 120 in the other direction. An elevated display may be lowered to an elevation that allows the display to be changed. The display may be exchanged for a new display, and the new display may then be raised to a desired elevation.

The member 106 may include cable seats 108. The cable seats 108 may be affixed to the member 106 such that the cable seats 108 rotate with the member 106 when the member 106 rotates. In some embodiments, the cable seats 108 may be formed directly on the member 106. Although two cable seats 108 are shown, more or fewer cable seats 108 may be used.

The cables may be affixed to, or otherwise interfaced with, the member 106 and/or the cable seats 108 such that the cables wind around the cable seats 108 when the member 106 rotates. In some embodiments, the cable seats 108 may be configured such that the cables wind and unwind from the cable seats 108 in the same direction. For example, the cables may be affixed to the left edges of the cable seats 108 such that each of the cables wind left-to-right and unwind right-to-left about the cable seats 108 as the member 106 is rotated. In some embodiments, the cables may be affixed such that the cables wind and unwind from the cable seats 108 in different directions. For example, the cables may be affixed such that the cables wind toward each other. In some embodiments, the cable seats 108 may include spiral grooves to promote an organized arrangement of a cable as the cable winds about and unwinds from the member 106.

In some embodiments, biasing systems 114 may be used to further promote an organized arrangement of the cables as the cables wind about and unwind from the cable seats 108. The biasing system 114 may include biasing members 116 configured to urge pressing members 118 towards the cable seat 108. In some embodiments, the pressing members 118 may include rollers.

The biasing systems 114 may urge the cables away from winding on top of their previous windings prematurely. The biasing systems 114 may also urge the cables away from slipping parallel to the axis of the member 106 and/or the cable seats 108. In some embodiments, grooves of the cable seats 108 may work with the biasing systems 114 to urge the cables away from slipping parallel to the axis of the member 106 and/or the cable seats 108. The biasing systems 114 and/or the grooves of the cable seats 108 may promote the cables to wind tightly around the cable seats 108 when the member 106 is rotated. The biasing systems 114 and/or the grooves of the cable seats 108 may promote the cables to wind primarily in a direction tangential to the axis of the member 106 and/or the cable seats 108.

Figure 2A:
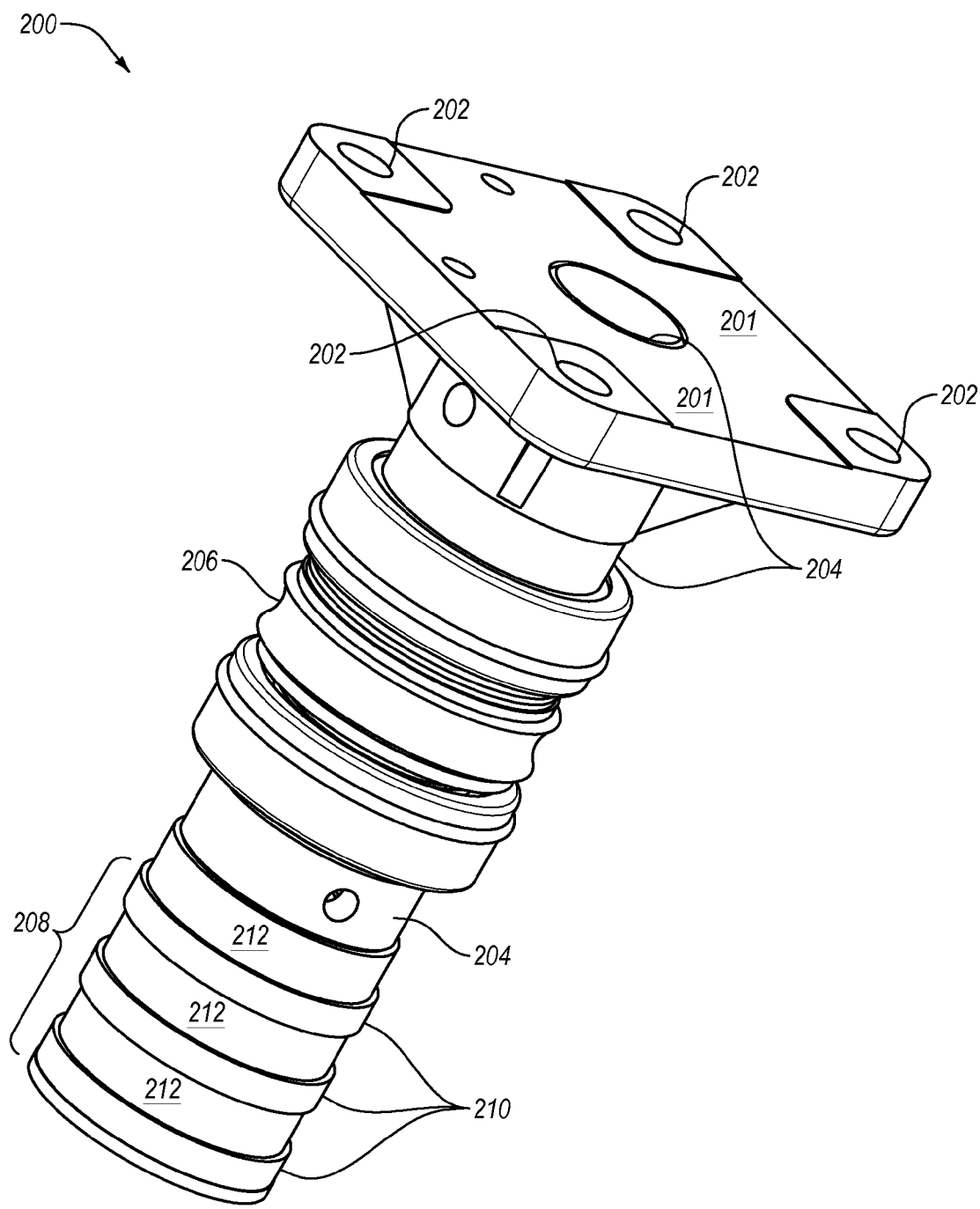
FIG. 2A illustrates a perspective view of an example anchor that may be included in the display system of FIG. 1A.

FIG. 2A illustrates a perspective view of an example anchor 200. The anchor 200 may generally correspond to the anchor 102 described with reference to FIGS. 1A and 1B. The anchor 200 may include a fastening member 201. The fastening member 201 may include fastening features 202 at which fasteners may be attached. For example, fasteners generally corresponding to the fasteners 104 described with reference to FIGS. 1A and 1B may be attached to the fastening features 202.

In some embodiments, the anchor 200 may include an electrical interface 208. The electrical interface 208 may include conductive members 210 and insulating members 212. The conductive members 210 and insulating members 212 may be configured such that an electrical source may be connected to the conductive members 210. For example, an electrical wire may run through the inside of the shaft 204 and electrically couple to the conductive members 210 inside the electrical interface 208. The electrical interface 208 may conductively couple to an electrical distributor. For example, the electrical interface 208 may conductively couple to the electrical distributor 122 described with reference to FIG. 1B. An example of a conductive coupling is described below with reference to FIG. 3A.

In some embodiments, the anchor 200 may include a substantially axially symmetrical gear seat 206. In some embodiments, the gear seat 206 may be affixed to the shaft 204. In some embodiments, the gear seat 206 may be formed as part of the shaft 204. The gear seat 206 may be configured to interface with a driver such that the driver rotates relative to the anchor 200 when the driver is run. In some embodiments, the gear seat 206 may include a worm gear configured to interface with a worm driver.

Figure 2C:
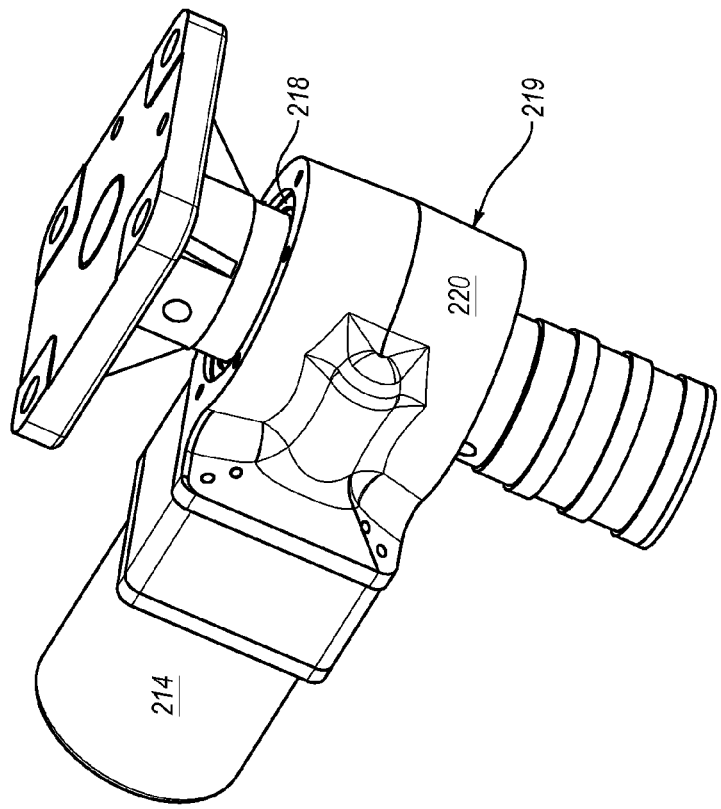
FIG. 2C illustrates the anchor of FIG. 2A including the rotator motor and a rotator collar.
Figure 2B:
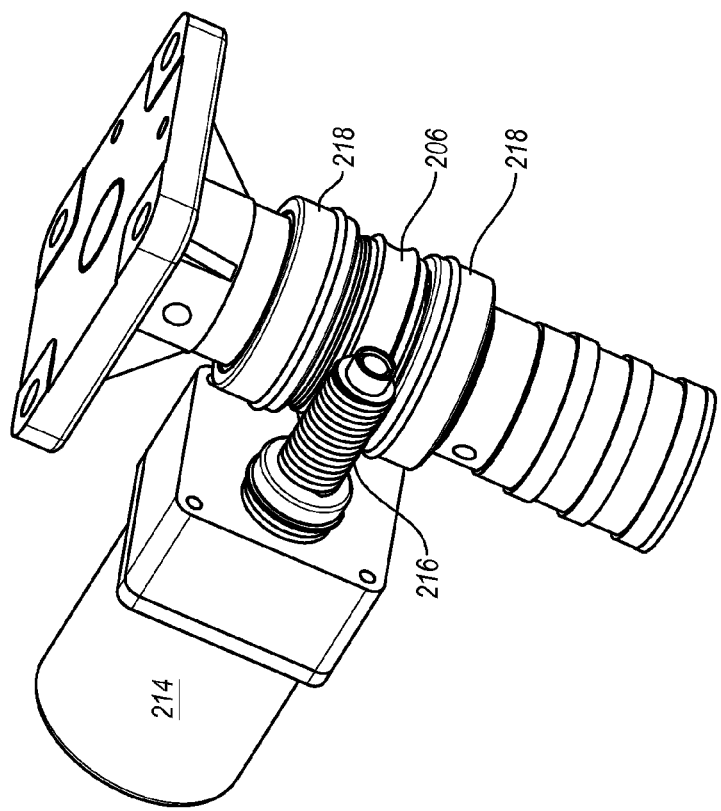
FIG. 2B illustrates the anchor of FIG. 2A including a rotator motor and bearings.

FIG. 2B illustrates the anchor 200 coupled to a rotator motor 214 and bearings 218. The rotator motor 214 may generally correspond to the rotator motor 124 of FIG. 1B. The rotator motor 214 may include a driver. In some embodiments, the driver 216 may be a worm driver configured to interface with a worm gear corresponding to the gear seat 206. In some embodiments, the bearings 218 may include ball bearings.

FIG. 2C illustrates the apparatus of FIG. 2B including the rotator motor 214 and a rotator collar 219. The rotator collar 219 may generally correspond to the rotator collar 123 described with reference to FIG. 1B. The rotator collar 219 may include the bearings 218 and a casing 220. The casing 220 may affix to an outer portion of the bearings 218. The casing 220 may also work to maintain an operational alignment between the driver 216 and the gear seat 206 shown in FIG. 2B. In some embodiments, the casing 220 may also work to hold lubricant around the driver 216 and gear seat 206. In some embodiments, the rotator motor 214 may cause the driver 216 to rotate. The interaction between the rotating driver 216 and the gear seat 206 affixed to the anchor 200 may cause in the rotator motor 214 and rotator collar 219 to rotate relative to the anchor 200.

FIG. 3A illustrates an example conductive coupling between an electrical distributor 307 and an electrical interface 309 of an anchor generally corresponding to the anchor 102 described with reference to FIGS. 1A-1B and the anchor 200 as described with reference to FIG. 2A-2C.

The electrical interface 309 may include conductive members 302 and insulating members 304. The conductive members 302 and insulating members 304 may generally correspond to the conductive members 210 and insulating members 212 of FIG. 2A. The electrical distributor 307 may generally correspond to the electrical distributor 122 of FIG. 1B.

The electrical distributor 307 may include a connecting member 306 (or conducting member). The conducting member 306 may be affixed to a rotator collar generally corresponding to the rotator collar 123 of FIG. 1B such that the electrical distributor 307 and the electrical interface 309 may be held in operational alignment as the electrical distributor 307 rotates relative to the electrical interface 309.

The electrical distributor may include conductive connectors 310 separated by insulating housing 308. In some embodiments, the conductive connectors 310 may be removably received by the insulating housing 308. The conductive connectors 310 may include conductive pads 311 biased against the associated conductive members 302 of the electrical interface 309. Biasing the conductive pads 311 against the associated conductive members 302 may prevent or at least lessen electrical connection losses due to manufacturing imperfections, translational movement of the electrical distributor 307 relative to the electrical interface 309, or the like.

FIG. 3B illustrates a conductive connector 310 and a conductive member 302. The conductive pad 311 may be biased against the conductive member 302 by a biasing member 312. The biasing member 312 may also act as a conductor between the biasing pad 311 and a conductive plate 313 (or biasing plate). A conductive line 314 may further act as a conductor between the biasing pad 311 and the biasing plate 313. The conductive line 314 may be configured to allow the biasing pad 311 to translate as necessary to maintain a connection with the conductive member 302. In some embodiments, a second conductive pad 311 may be used. A second conductive pad has been omitted from the illustration of FIG. 3B for clarity.

Figure 4A:
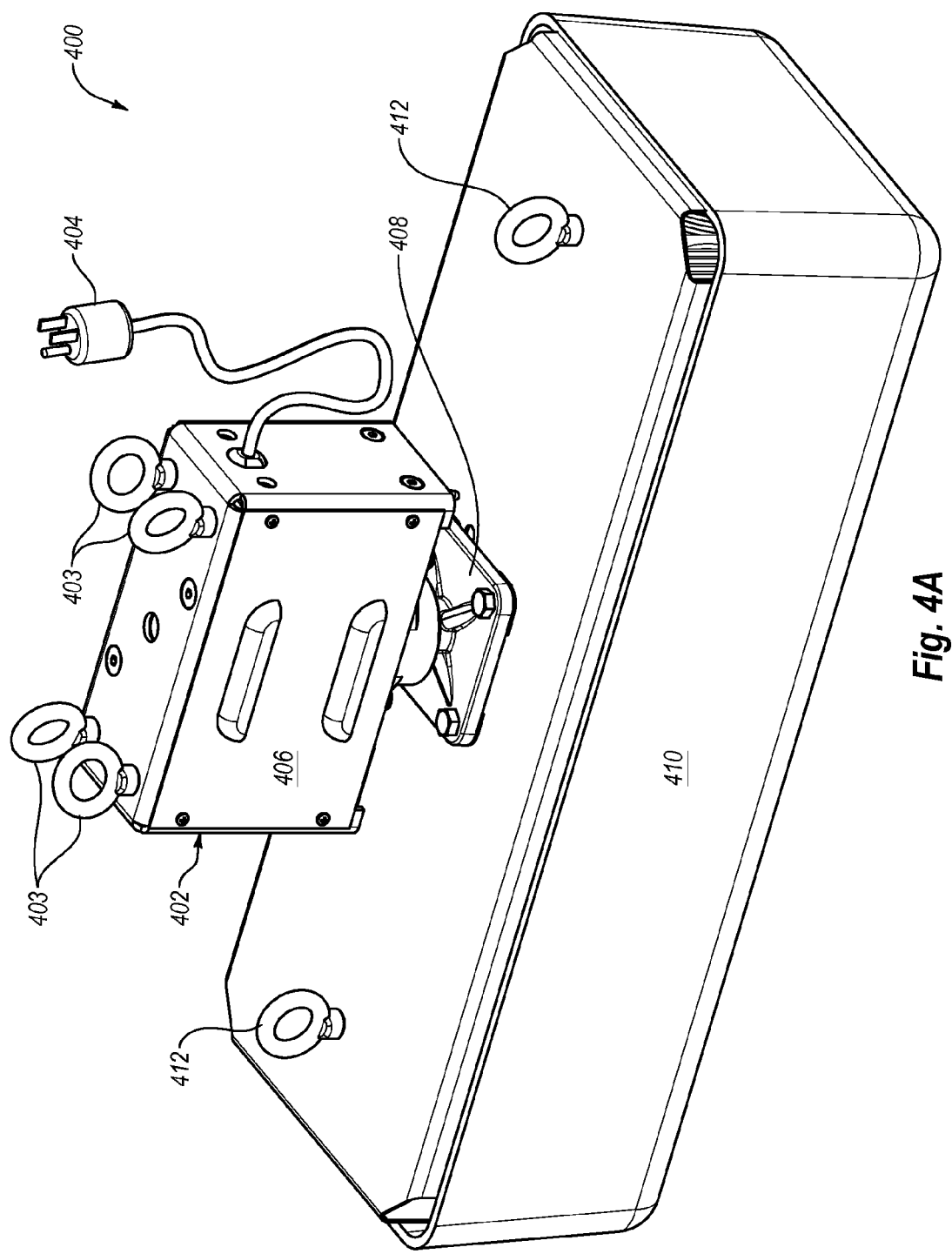
FIG. 4A illustrates a perspective view of another example display system.

FIG. 4A illustrates a perspective view of another example display system 400. The system 400 includes a rotator 402. The rotator 402 may generally correspond to the rotator 125 described with reference to FIGS. 1A-1B. The rotator 402 includes an anchor 406. The anchor 406 may be affixed to an elevated surface via fasteners 403 in a manner generally corresponding to the fasteners 104 described with reference to FIGS. 1A-1B. The rotator 402 may be attached to an electrical power source via a connector 404.

The rotator 402 includes a rotating portion 408 configured to rotate relative to the anchor 406. The rotating portion 408 may be attached to a housing 410 generally corresponding to the housing 110 described with reference to FIGS. 1A-1B. The rotator 402 may also provide an access to electrical power that rotates relative to the anchor 402 with the rotating portion 408. In some embodiments, providing the access to electrical power that rotates with the rotating portion 408 may be performed in a manner generally corresponding to the conductive coupling described with reference to FIGS. 3A-3B.

The rotator 402 may be configured to be removed from the housing 410 such that the housing 410 may be affixed to an elevated surface via fasteners 412.

Figure 4B:
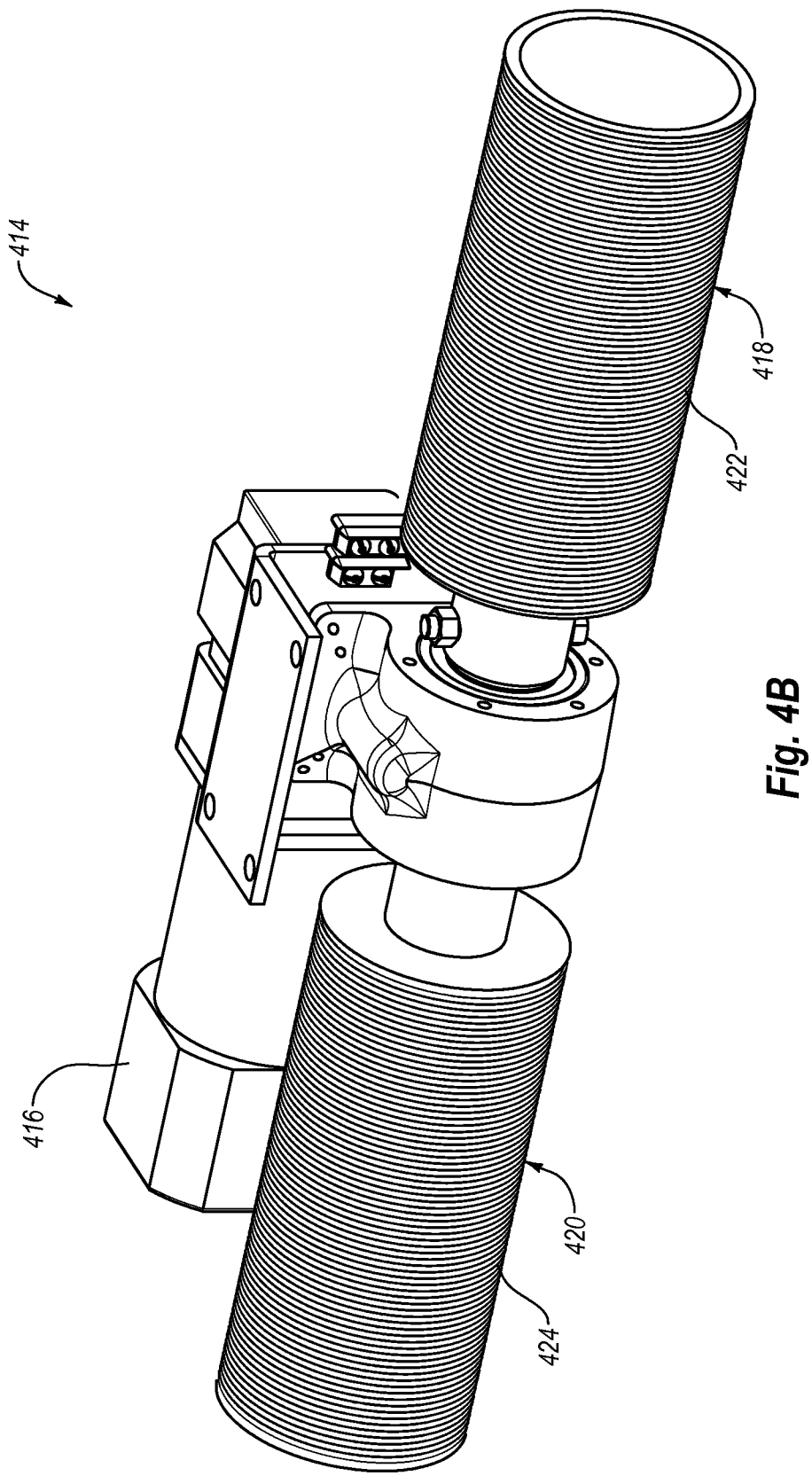
FIG. 4B illustrates a perspective view of an example hoist of the display system of FIG. 4A.

FIG. 4B illustrates a perspective view of an example hoist 414 of the system 400. The hoist 414 may include a hoist motor 416. The hoist motor 416 may generally correspond to the hoist motor 120 described with reference to FIGS. 1A-1B.

The hoist 414 may include a member 418 and a member 420. The members 418 and 420 may be rotated in unison by the hoist motor 416. In some embodiments, the members 418 and 420 may be mechanically coupled. The members 418 and 420 may include cable seats 422 and 424, respectively generally corresponding to the cable seats 108 as described with reference to FIG. 1B. The members 418 and 420 may wind and unwind cables in a manner generally corresponding to the member 106 described with reference to FIGS. 1A-1B. In some embodiments, the hoist motor 416 and the members 418 and 420 may be configured in a manner similar to the anchor 102, rotator collar 123, and rotator motor 124 described with reference to FIGS. 1A-1B such that the hoist motor 416 may drive the members 418 and 420 to rotate via a mechanically coupled shaft or the like.

Figure 4C:
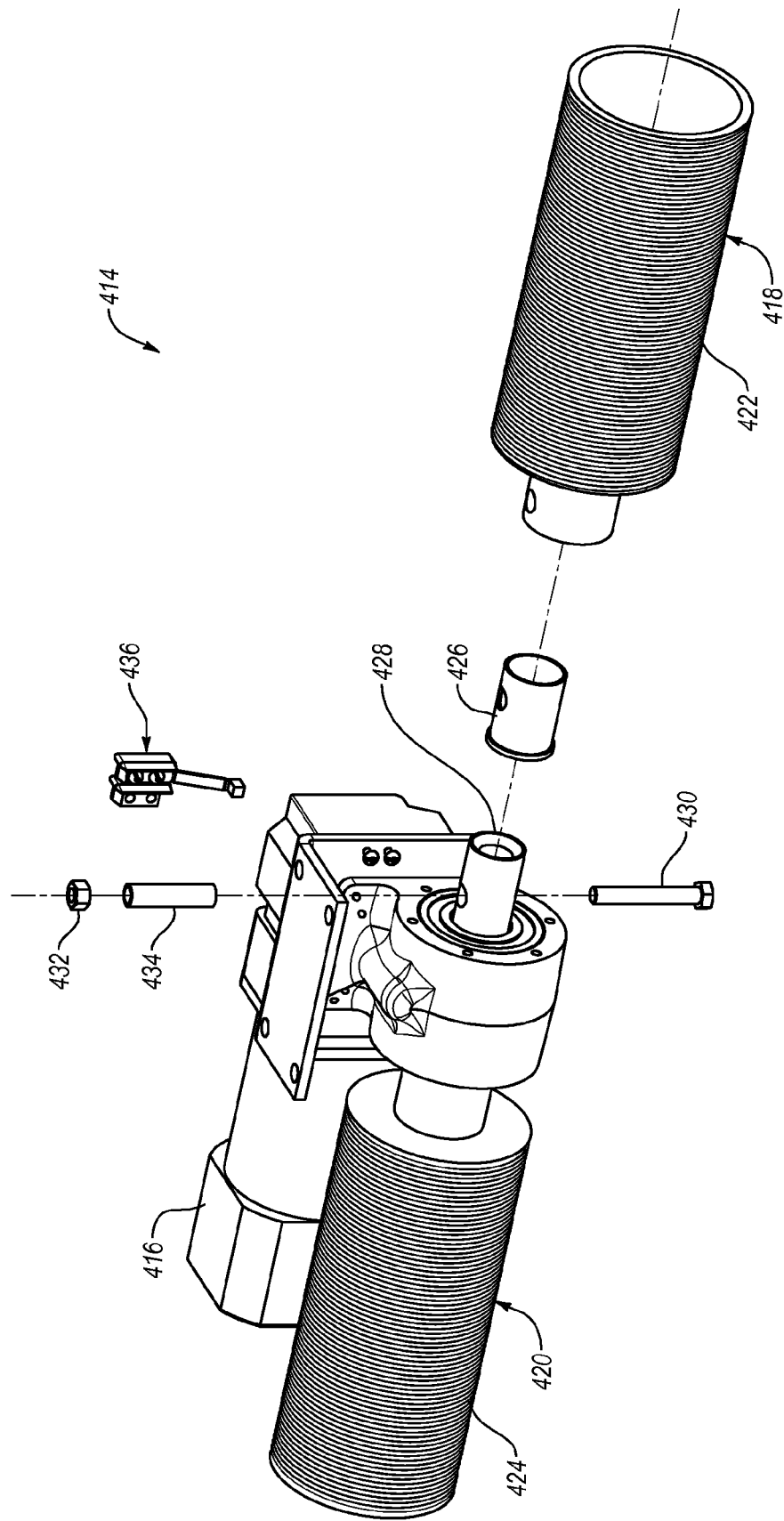
FIG. 4C illustrates an exploded perspective view of the hoist of FIG. 4B.

FIG. 4C illustrates an exploded view of the hoist 414. In some embodiments, the members 418 and 420 and/or the cable seats 422 and 424 are conductive. The member 418 may be electrically isolated from the hoist motor 416 and the member 420. A dielectric sleeve 426 may be located between the member 418 and a shaft 428 of the hoist motor 416. In some embodiments, the dielectric sleeve 426 may include a dielectric polymer. A fastener may be used to secure the shaft 428, the dielectric sleeve 426, and the member 418 together. For example, a bolt 430 and a corresponding nut 432 may be used to secure the shaft 428, the sleeve 426, and the member 418 together. In some embodiments, a dielectric sleeve 434 may be located around a portion of the bolt 430. For example, the dielectric sleeve 434 may be located around a portion of the bolt 430 when a conductive bolt 430 is used to secure the shaft 428, the sleeve 426, and the member 418 together. Advantageously, the dielectric sleeve 426 and/or the dielectric sleeve 434 may allow the member 418 to be electrically isolated from the shaft 428 while allowing conductive materials to be used for the shaft 428 and/or the bolt 430.

The hoist 414 may include a conductive brush 436 configured to conductively contact the first member 418 as the first member 418 is rotated. A first voltage may be applied to the brush 436 such that the first voltage is also applied to the first member 418. In some embodiments, a controller generally corresponding to the controller 126 described with reference to FIG. 1B may distribute power from a power source such that the first voltage is applied to the brush 436 and the first member 418.

In some embodiments, the conductive brush 436 includes a portion configured to conductively contact a body of the hoist motor 416. A second voltage may be applied to the portion of the brush 436 configured to conductively contact the body of the hoist motor 416 such that the second member 420 is also at the second voltage. For example, the body of the hoist motor 416 and the second member 420 may be conductively connected. In some embodiments, another conductive brush generally corresponding to the conductive brush 436 may be configured to conductively contact the second member 420 as the second member 420 is rotated. The second voltage may be applied to the other conductive brush such that the second voltage is also applied to the second member 420. Alternately or additionally, the second member 420 may be conductively coupled to the housing 410 of the system 400 and the second voltage is applied to the housing 410. For example, the housing 410 may be conductively connected to ground of an electric power source, such as the electric power source accessed by the rotator 402 via the connector 404.

Conductive cables may be conductively coupled to the first member 418 and the second member 420. In some embodiments, the conductive cables may include unsheathed metal cables. The first member 418 may apply the first voltage to the conductive cable conductively coupled to the first member 418. For example, the first member 418 may apply the first voltage to the conductive cable at a location where the conductive cable is affixed to the first member and/or where the conductive cable is wound about the first member 418. Similarly, the second member 420 may apply the second voltage to the conductive cable conductively coupled to the second member 420. The first voltage and the second voltage may be selected such that an electric current may be delivered to a circuit conductively coupled to the cables conductively coupled to the first member 418 and the second member 420.

In some embodiments, the second voltage applied to the second member 420 may be a ground of an electrical source, such as the electrical source accessed by the rotator 402 via the connector 404. Alternately or additionally, the first voltage may be a relatively low voltage. In some embodiments, the first voltage may be in a range of about 0 volts direct current (VDC) to about 24 VDC in reference to ground and/or the second voltage. For example, the first voltage may be in a range of about 1.5 VDC to about 24 VDC in reference to the ground and/or the second voltage. Alternately, the first voltage may be below about 0 VDC or above about 24 VDC in reference to ground and/or the second voltage.

In some embodiments, the member 418 and/or the cable seat 422 may be non-conductive. For example, the member 418 and/or the cable seat 422 may be formed from a dielectric material such as a dielectric polymer. The first voltage may be applied directly to a conductive cable attached to the non-conductive member 418 and/or the cable seat 422 as the member 418 is rotated. The first voltage may be applied directly to the conductive cable via a conductive wire or the like. In some embodiments, the system 400 may maintain a conductive contact with the conductive wire such that the first voltage may be applied to the conductive wire in a manner generally corresponding to the conductive coupling as described with reference to FIGS. 3A-3B. The member 420 and/or the cable seat 424 may be conductive and the second voltage may be applied to the member 420 and/or the cable seat 424.

Advantageously, allowing the system 400 to deliver electrical power via conductive cables conductively coupled to the first member 418 and the second member 420 may allow a display attached to the cables to be enhanced. For example, an illumination source may illuminate the display. Alternately or additionally, lights may be incorporated into the display. Alternately or additionally, audio output such as sound effects, music, and the like may be incorporated into the display. Other electronic devices such as motion detectors, image capturing devices, and the like may be included into the display.

Furthermore, by delivering electrical power via conductive cables used to support the display, additional electrical wires running from the housing 410 to the display may be avoided. Such additional electrical wires may be unsightly and may detract from the appearance of the display. Furthermore, systems for lifting and lowering additional wires as the display is raised and lowered may add to the complexity of the system 400.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A display system, comprising:
   a housing;
   an attachment mechanism;
   a rotator motor configured to selectively rotate the housing relative to the attachment mechanism; and
   a hoist disposed within the housing, the hoist comprising:
      a first member, and
      a hoist motor configured to selectively rotate the first member such that a first cable functionally coupled to the first member is wound about the first member when the first member is rotated in a first direction and the first cable is unwound from the first member when the first member is rotated in a second direction.

2. The display system as in claim 1, wherein the attachment mechanism comprises an anchor configured to be attached to an elevated surface.

3. The display system of claim 1, wherein the hoist further comprises a second member and is configured to selectively rotate the second member such that a second cable functionally coupled to the second member is wound about the second member when the second member is rotated in the first direction and the second cable is unwound from the second member when the second member is rotated in the second direction.

4. The display system of claim 3, further comprising a first dielectric sleeve, disposed between the second member and a conductive shaft of the hoist motor, and a second dielectric sleeve, disposed around a portion of a fastener used to secure the conductive shaft, the first dielectric sleeve, and the second member together, the first and second dielectric sleeves electrically isolating the second member from the conductive shaft of the hoist motor.

5. The display system of claim 1, wherein the housing is configured to at least partially enclose the rotator motor and the hoist.

6. The display system of claim 1, further comprising a rotator collar attached to the rotator motor and the housing, the rotator collar comprising:
   a bearing;
   a casing affixed to the bearing, the casing configured to maintain an operational alignment between a driver of the rotator motor and a gear seat of the attachment mechanism,
   wherein the rotator motor drives the rotator collar and the housing to rotate relative to the attachment mechanism.

7. The display system of claim 6, wherein the driver is a worm driver.

8. The display system of claim 1, wherein the hoist comprises another hoist motor.

9. A display system comprising:
   a housing;
   an attachment mechanism;
   a hoist configured to raise and lower a display;
   a power source; and
   a rotator motor; wherein the rotator motor is:
      disposed within the housing and contains a drive mechanism which is configured to selectively rotate the attachment mechanism relative to the hoist; and
      attached to and powered by the power source and drives the attachment mechanism in a rotating motion such that the attachment mechanism rotates relative to the hoist.

10. The display system of claim 9, the attachment mechanism is configured to rotate orthogonally relative to the hoist.

11. The display system of claim 9, wherein the attachment mechanism comprises an electrical interface, the electrical interface comprising a conductive member and an insulating member configured such that an electrical source may be connected to the conductive member.

12. The display system of claim 11, further comprising an electrical distributor, the electrical distributor comprising a conductive pad and a conductive biasing member, the conductive biasing member biasing the conductive pad against the conductive member.

13. The display system of claim 11, wherein the attachment mechanism further comprises a shaft, wherein an electrical wire runs through an inside of the shaft, the electrical wire electrically coupled to the conductive member disposed inside the electrical interface.

14. The display system of claim 9, further comprising an electrical distributor conductively coupled to the attachment mechanism such that electrical power is available at the hoist as the hoist rotates relative to the attachment mechanism.

15. The display system of claim 14, further comprising a controller, wherein the controller is wired to the electrical distributor, controls electrical power to the rotator motor, and comprises a radio receiver configured to receive operation instructions from a radio transmitter.

16. The display system of claim 9, wherein the rotator motor comprises a radio receiver configured to receive operation instructions from a radio transmitter.

17. The display system of claim 9, wherein the hoist comprises a hoist motor configured to selectively rotate the first member such that a first cable functionally coupled to the first member is wound about the first member when the first member is rotated in a first direction and the first cable is unwound from the first member when the first member is rotated in a second direction.

18. A display system, comprising:
a housing;
a rotator motor configured to rotate the housing relative to a fixed position such that a display held by the display system is rotated; and
a hoist disposed within the housing, the hoist comprising a hoist motor configured to raise the display when the hoist motor runs in one direction and lower the display when the hoist motor runs in another direction, the hoist disposed in the housing.

19. The display system of claim 18, wherein the hoist further comprises a first member and a second member, the hoist motor further configured to:
selectively rotate the first member such that a first cable functionally coupled to the first member is wound about the first member when the first member is rotated in a first direction and the first cable is unwound from the first member when the first member is rotated in a second direction; and
selectively rotate the second member such that a second cable functionally coupled to the second member is wound about the second member when the second member is rotated in the first direction and the second cable is unwound from the second member when the second member is rotated in the second direction.

20. The display system of claim 19, wherein:
the first member is conductive and has a first voltage,
the second member is conductive and has a second voltage different than the first voltage,
the first cable is conductive and is conductively coupled to the first member, and
the second cable is conductive and is conductively coupled to the second member such that an electric current is delivered to a circuit conductively coupled to the first cable and the second cable.

\* \* \* \* \*